Figure 1:
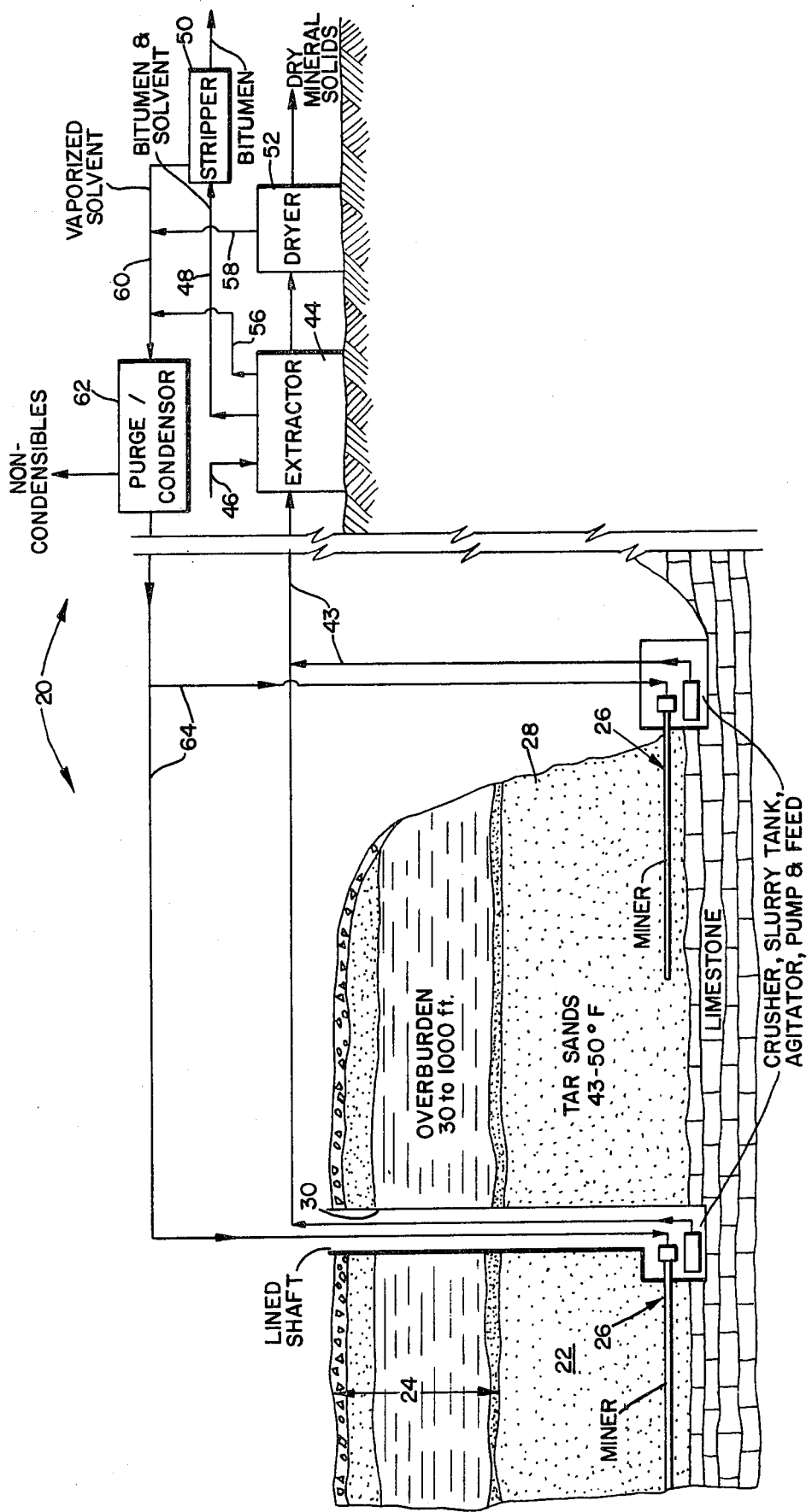

United States Patent [19]

Smith et al.

[11] 4,067,616

[45] Jan. 10, 1978

[54] METHODS OF AND APPARATUS FOR MINING AND PROCESSING TAR SANDS AND THE LIKE

[75] Inventors: Clay D. Smith; Douglas V. Keller, Jr., both of Lafayette, N.Y.

[73] Assignee: Standard Oil Company, Chicago, Ill.

[21] Appl. No.: 662,890

[22] Filed: Mar. 1, 1976

Related U.S. Application Data

[63] Continuation-in-part of Ser. No. 460,558, April 12, 1974, Pat. No. 3,941,679.

[51] Int. Cl.² .............................................. E21C 41/10
[52] U.S. Cl. .......................................... 299/7; 137/13; 302/66
[58] Field of Search .......................... 299/4, 5, 7, 18; 166/268, 308, 272, 208, 267, 305 R, 307; 208/11 LE; 302/66; 137/13

[56] References Cited

U.S. PATENT DOCUMENTS

| 2,859,818 | 11/1958 | Hall et al. | 166/308 UX |
| 3,389,714 | 6/1968 | Hughes et al. | 302/66 |
| 3,472,553 | 10/1969 | Miller | 299/5 |
| 3,925,189 | 12/1975 | Wicks | 137/13 |
| 3,941,679 | 3/1976 | Smith et al. | 166/268 X |

Primary Examiner—Ernest R. Purser
Attorney, Agent, or Firm—Strauch, Nolan, Neale, Nies & Kurz

[57] ABSTRACT

Methods of and apparatus for recovering bitumen from tar sands and the like in which the tar sand is mechanically dislodged from the formation in which it is deposited and in which a solvent for the bitumen is mixed with the mined material to reduce the viscosity of the bitumen and thereby facilitate the transfer of the mined material to an operation where the bitumen is separated from solid components of the tar sand.

13 Claims, 2 Drawing Figures

METHODS OF AND APPARATUS FOR MINING AND PROCESSING TAR SANDS AND THE LIKE

This application is a continuation-in-part of application No. 460,558 filed Apr. 12, 1974 (now U.S. Pat. No. 3,941,679).

The present invention relates to the recovery of native hydrocarbons and, more particularly, to novel, improved methods and apparatus for recovering tar sands and similar composites of hydrocarbons and mineral solids from the geological formations in which they are found. This problem is a formidable one.

Heretofore, two methods of recovering tar sands or at least their hydrocarbon constituents have been proposed. One is strip mining, the other in situ extraction of the hydrocarbons from the tar sand formation.

Strip mining of tar sand deposits involves clearing the overburden, excavating the exposed tar sand, and conveying the latter to a recovery plant. The problems posed in strip mining tar sands are overwhelming. In the Athabasca deposits, for example, the overburden is typically 30 to 1000 feet thick. The amount of material which must be moved simply to reach the deposits is enormous. Furthermore, the sheer amount of material involved presents a severe ecological problem.

In the Athabasca deposits, for example, it is a general rule-of-thumb that one ton of overburden must be removed to make two tons of tar sand accessible, and that much sand will yield less than one barrel of bitumen ton.

Also, the overburden in the Athabasca deposits is essentially peat moss and slimes, and it must be drained before stripping can proceed. This is a two-year proposition and a substantial additional economic burden.

Furthermore, stripping of the overburden can be carried out only in the summertime. The overburden is employed in dikes for tailing ponds and must accordingly be consolidated before it freezes.

Excavation of the tar sand after it is exposed is no less of a problem than the stripping of the overburden.

Tar sands are highly abrasive. Keeping machinery operating consequently becomes an expensive proposition.

In addition the consistency of tar sands presents major problems. In warm weather tar sands become so soft they will not support heavy equipment. In cold weather they become harder than concrete. Excavator teeth have been observed to become red hot, and even specially hardened teeth have had to be replaced after being used for as few as four hours in wintertime operations.

Furthermore, the water content of the tar sand may be as high as 37 percent. Accordingly, at temperatures around the freezing point, the tar sand tends to freeze to excavator and conveyor surfaces, requiring that these surfaces be sprayed with an antifreeze such as methanol to keep the operation going. Again, the cost of removing the material is increased.

In situ solvent extraction of tar sands involves the use of a solvent or a solvent and heat to liberate the bitumen from the mineral solids of the composite followed by the pumping of the bitumen-laden solvent to the surface and recovery of the solvent.

Solvent mining of tar sands is disclosed in U.S. Pat. Nos. 1,502,261 issued July 22, 1924, to McArthur; 3,050,289 issued Aug. 21, 1962, to Gerner; 3,157,231 issued Nov. 17, 1964, to Darley; and 3,472,553 issued Oct. 14, 1969, to Miller, Naphtha is typical of the solvents which have heretofore been proposed for in situ recovery of bitumen from tar sands. It is estimated that from 20 to 40 percent of the naphtha injected into a tar sand deposit could not be recovered. Accordingly, solvent extraction processes as heretofore proposed are not economically feasible.

Furthermore, the Miller patent cited above points out that solvent extraction as described in the prior art is also economically impractical because the solvents proposed do not penetrate to any significant extent into the formation. Consequently, innumerable injections must be made to recover any significant amount of hydrocarbons.

In a solvent extraction related process hot water or steam would be employed to release the hydrocarbon materials from the mineral solids with which they are associated in the formation. Processes of this character are described in U.S. Pat. Nos. 636,117 issued Oct. 31, 1899, to Cooper; 1,418,098 issued May 30, 1922, to Schneiders; and 1,607,586 and 1,612,611 issued Nov. 16 and Dec. 28, 1926, to Claytor. We are not aware of any process of this character having proved economically feasible.

Furthermore, as pointed out in parent application Ser. No. 460,558, there are tremendous problems involved in any tar sand extraction process employing water from the availability, ecological, and economic viewpoints.

In situ combustion to stimulate the release of the bitumen falls in the same category as solvent extraction and related processes. To data no one has discovered how to recover tar sand bitumen by this technique in a way that is economically feasible.

Finally, a drawback common to all heretofore proposed in situ recovery techniques described in the prior art is that recovery rates are extremely low. None of these techniques even has the potential in theory of recovering more than 10–20 percent of the hydrocarbons present in a formation.

We have now discovered a novel, improved technique for recovering tar sands which is much superior to and does not have the disadvantages of the prior art recovery processes described above. Furthermore, this recovery technique is completely compatible with the novel process for extracting the bitumen from the associated mineral solids described in parent application Ser. No. 460,558.

Briefly, we recover tar sands from the deposits in which they are located by a mining technique which features mechanical dislodgement of the material and the use of a fluorochlorocarbon solvent (preferably trichlorofluoromethane) to reduce the viscosity of the dislodged material and facilitate its removal from the formation. The use of a fluorochlorocarbon for this novel purpose is a feature of considerable importance.

Specifically, tar sands are invariably covered with a thick overburden although outcroppings of the deposit may occur. Accordingly, the temperature in a deposit which has not been exposed will lie between the extremes referred to above and will tend to remain fairly constant the year around. For example, the temperature in one instance with the overburden in place was found to be in the 43°–50° F range.

Even at these relatively moderate temperatures, however, the viscosity of the composite is over one million centipoises which means that the problem of conveying it is still difficult. By mixing the solvent with the material as it is dislodged in accordance with the present invention, however, the viscosity of the bitumen in the composite can be reduced to a level at which it can be handled as a liquid. Copending application Ser. No. 493,475 (now abandoned) shows, for example, that less than 20 percent by volume trichlorofluoromethane will reduce the viscosity of Athabasca tar sand bitumen to less than 500 centipoises and that less than 40 percent will reduce the viscosity of the bitumen to well below 100 centipoises. Even as little as 10 percent solvent by volume produces a marked decrease in the viscosity of the tar sand.

At these lower viscosities the viscosity of the tar sand is essentially that of the bitumen. Accordingly, the entire composite is easily conveyed.

It is also important in this respect that the dissolution of the bitumen proceeds with great rapidity even at low ambient temperatures.

From the mining machine the tar sand is preferably routed through a crusher to eliminate large lumps, thereby facilitating handling and subsequent separation of the bitumen. Thereafter, the tar sand is slurried with additional solvent and pumped to a station, typically aboveground, where separation of the bitumen from the solids can be completed in the manner described in parent application Ser. No. 460,558.

Auger miners similar to those currently used in mining coal are preferred for dislodging the tar sand. Such machines can recover material as much as 200-300 feet away from the working face, and they have a high output (39.8 tons per man day in 1969).

Also, auger type mining machines are mobile and can be readily redirected and relocated to permit the removal of maximum amounts of a deposit. In mining tar sands this desirable goal is promoted by subsidence of the deposit into the mined out area as the operation continues. That is, at the temperatures existing in the deposit, the tar sand is flowable even though its viscosity is extremely high; and there is typically a great weight of overburden. Accordingly, as material is removed, the tar sand flows down into the vacated area, making additional material available to the miner.

The net result is that up to 60-80 percent of a tar sand deposit can be recovered from the formation by applying the principles of the present invention. Because virtually all of the bitumen can then be recovered from the tar sand using the process described in our parent application, this novel technique leads to recovery rates 3 to 10 times higher than those even predicted to be possible in theory for heretofore proposed, in situ recovery techniques.

The deposit can be attacked from a vertical outcrop or from a shaft, minimizing the amount of overburden which must be removed and the problems caused by the sheer bulk and muskeglike character of the overburden.

The deposit need support only a minimum of machinery and that only in areas where it is protected by overburden for the most part. Consequently, the problems encountered in strip mining by the poor load bearing capabilities of tar sands as they are heated can be easily avoided.

As the overburden is not removed to any significant extent in mining tar sands by our novel technique, there is also less disturbance of surface contours, minimizing the environmental impact of the mining operation.

Because the temperatures in the deposit remain moderate the year around, the tar sand does not pose the problem that it does in the wintertime in strip mining. The damage of hardened tar sand to excavating and conveying equipment is eliminated as is the freezing of the tar sand to the equipment.

Another advantage of our novel recovery technique is that, while it does employ solvents, these are not required to solubilize the material being recovered as in in situ solvent extraction techniques. Furthermore, they are used in what are or can be made essentially closed systems, and loss of the solvent is consequently reduced to an economically acceptable rate.

No water or steam is required in our process. Consequently, the problems which arise when viscous, tarry hydrocarbons come into contact with water are eliminated.

As our process is carried out in a liquid or vapor chlorofluorocarbon environment, the tar sands are exposed to little or no oxygen, and, consequently, a more easily upgraded, unoxidized bitumen will be supplied to the upgrading facility.

Our process is carried out at ambient temperature.

Consequently, the cost of supplying heat as in those processes using hot water or steam is avoided.

Also the McArthur patent identified above states that the application of heat to a tar sand will convert it into a valueless, rock-like material. Our process eliminates problems of that character.

As indicated above, trichlorofluoromethane is the solvent preferably employed in our novel tar sand mining technique. This is in part because of the alacrity with which tar sand bitumen dissolves in this material.

In addition, trichlorofluoromethane is not flammable. It has low boiling and freezing points (ca. 75 and $-168°$ F., respectively); a low heat of vaporization; and low viscosity and surface tension, all of which are desirable. The compound does not react with hydrocarbons; and it is non-toxic and non-corrosive, available in large quantities at reasonable cost, and almost completely recoverable at low cost in the course of the process. These are all important factors from the economic and safety viewpoints.

The novel technique just described is both different from and superior to the solvent or hydraulic mining of tar sands as described in the above-identified patent to Gerner and in U.S. Pat. Nos. 2,587,729 and 2,678,703 issued March 4, 1952, and May 11, 1954, to Huff. The naphtha and gas oil fractions employed in these patented processes present a considerable fire and explosion hazard, particularly when collected in a pool as in the Gerner process. Furthermore, in the latter, evaporation of the solvent into the surrounding atmosphere would proceed so rapidly as to make the process economically impractical.

The apparatus of Huff and Gerner are both designed for operation in an open pit. This requires that the overburden be stripped away; and it was pointed out above that this poses problems of considerable magnitude.

In this regard one important application of our invention is continuing the exploitation of a tilted formation after the overburden has become too deep for strip mining to be economically feasible. The Huff and Gerner systems would not be useful in these circumstances.

On the other hand, pressures at the levels at which we may operate can reach many thousands of pounds per square inch. Under these pressures tar sands are rock hard and highly impermeable. Merely spraying a solvent as used by Huff or Gerner onto a tar sand formation would not be effective in these circumstances.

The Miller patent identified above and U.S. Pat. Nos. 3,510,168 issued May 5, 1970, to Camp and 3,874,733 issued Apr. 1, 1975, to Poundstone do disclose mining techniques which combine mechanical and hydraulic mining. However, the devices used to effect mechanical dislodgment of the material as disclosed in the Poundstone and Miller patents would not be practical.

Furthermore, the Poundstone process is intended for mining coal, not tar sands, and employs aqueous magnetite slurries, mediums commonly used in the hydrobeneficiation of coal. The presence of such media would make the process unsuitable for our purposes.

Camp employs water as the hydraulic fluid in his process, giving it all the problems associated with mixing tar sand bitumen and water.

From the foregoing it will be apparent to the reader that the primary object of our invention resides in the provision of novel, improved methods and apparatus for making more efficient and economical the recovery of bitumen and comparable native hydrocarbons from tar sands and the like.

A related, important and primary object of the invention resides in the provision of novel, improved methods and apparatus for extracting tar sands and the like from the formations in which they are deposited.

Other important but more specific objects of the invention are the provision of methods and apparatus in accord with the preceding object:

1. which are economical;
2. which minimize ecological damage;
3. which are safe;
4. which, essentially, eliminate the necessity of removing and disposing of overburden and the problems associated therewith;
5. which can be carried out efficiently on a year round basis;
6. which employ a solvent to facilitate handling of the composite but differ from in situ solvent extraction processes in that only minimal amounts of the solvent are not recovered;
7. which do not employ aqueous fluids and are therefore free of the problems resulting from the contact of water and tar sand bitumens or similar tarry substances and the lack of water in many areas where tar sands are found;
8. which are carried out at ambient temperatures and thereby avoid the cost of and problems associated with supplying heat to a mining operation;
9. which employ solvents that are non-flammable, non-toxic, non-corrosive, and have optimum physical properties.

Figure 2:
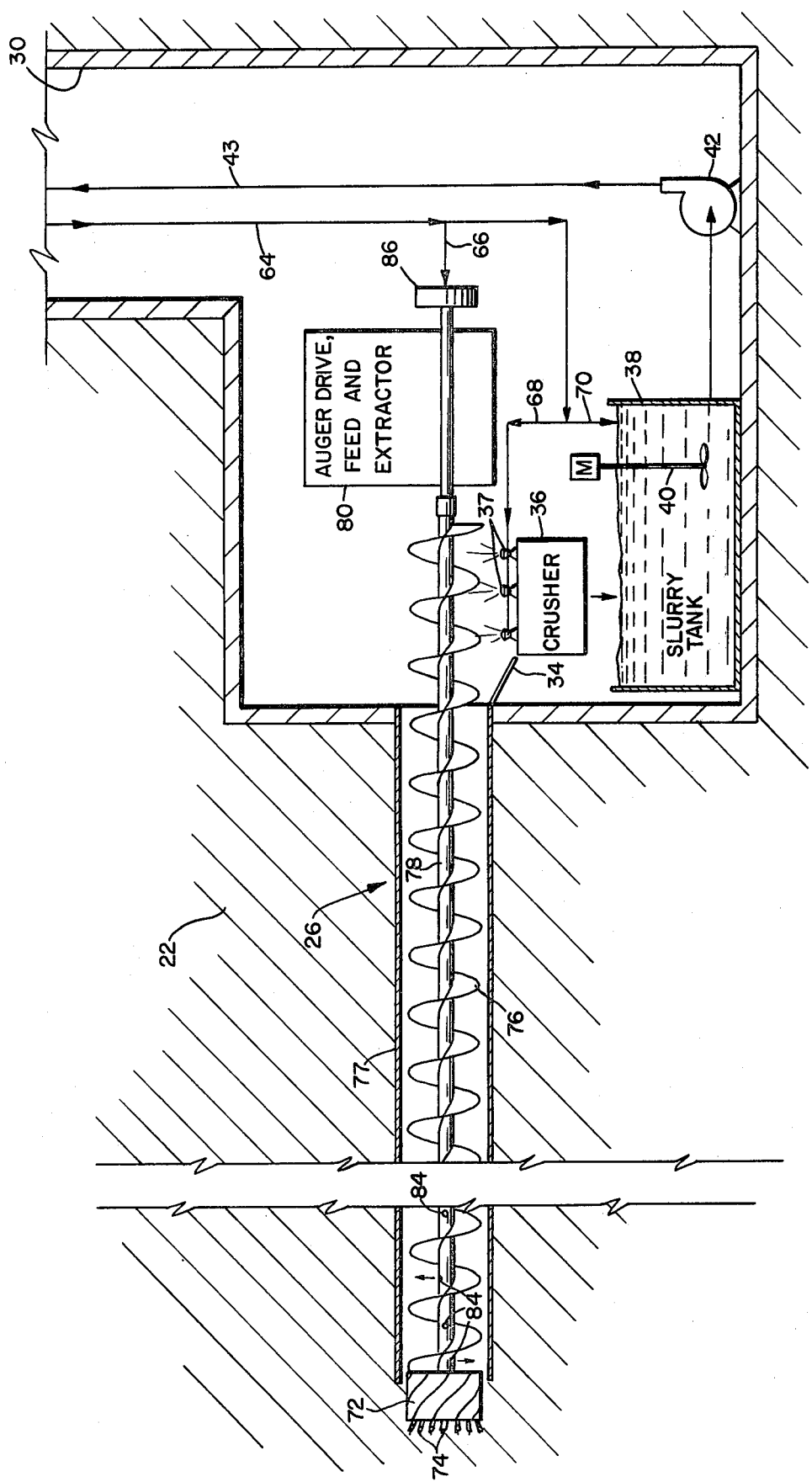

Other objects and features and additional advantages of our invention will become apparent from the appended claims and as the ensuing detailed description and discussion proceeds in conjunction with the accompanying drawing, in which:

FIG. 1 is a pictorial view illustrating the mining of tar sands and the like in accord with the principles of the present invention; and FIG. 2 is a primarily schematic, vertical section through mining apparatus employing the principles of our invention.

Referring now to the drawing, FIG. 1 depicts a system 20 for recovering bitumen from a tar sand formation 22 underlying overburden 24. The tar sand is removed from formation 22 by mining apparatus 26 embodying and constructed in accord with the principles of the present invention.

As shown in FIG. 1, the formation can be attacked from a vertical outcropping or stripped face 28 or from a vertical, lined shaft 30. In both cases the mining operation is preferably initiated at the bottom of formation 22. As pointed out above, this promotes the efficiency of the operation because, as tar sand is removed from formation 22, material above it will tend to flow down into the resulting void, bringing it within the reach of the mining apparatus without redirecting or relocating the latter.

Referring now to both FIGS. 1 and 2, the tar sand dislodged by mining apparatus 26 is conveyed from the mining apparatus down a chute 34 into a crusher 36 adjacent the working face where the top size of the tar sand is reduced to facilitate its further handling. Preferably, the tar sand is wet ground. A solvent as described above is in this case sprayed onto the material in crusher 36 through nozzles 37 to facilitate the comminution process.

From crusher 36 the tar sand flows into a slurry tank 38 equipped with an agitator 40. Here, the tar sand is slurried with a fluorochlorocarbon solvent as described above to further facilitate the subsequent movement of the tar sand.

A slurry pump 42 pumps the resulting slurry through conduit 43 to an extractor 44, typically located on the surface and preferably of the character disclosed in parent application Ser. No. 460,558. Here, the tar sand slurry is contacted with additional solvent introduced through conduit 46 to separate the bitumen constituents of the tar sand from its solid components.

From the extractor, the bitumen-laden solvent flows through conduit 48 to a stripper 50, again preferably of the construction disclosed in parent application Ser. No. 460,558, where the solvent is removed to isolate the bitumen.

Not all of the solvent need be removed. Instead, enough can be left so that the bitumen can be readily pumped to a refinery or other processing operation. In fact the stripping step can be eliminated and all of the solvent retained for this purpose.

The mineral solids from which the bitumen is separated in extractor 44 are transferred to a dryer 52 where the solvent still associated with the solids is removed. The solids are then typically conveyed back to the mining site and spread to compensate for subsidence resulting from the removal of the tar sand.

Solvent recovered from dryer 52 and stripper 50 and that evolved in extractor 44 is conveyed through conduits 56, 58, and 60 to a purge, condensor unit identified by reference character 62 in FIG. 1. Here, noncondensibles are stripped from the solvent; and it is liquified, all in the manner described in parent application Ser. No. 460,558.

From unit 62 the solvent is recirculated through main conduit 64 and branch conduits 66, 68, and 70 to mining apparatus 26, crusher 36, slurry tank 38 to complete the cycle.

Referring now specifically to FIG. 2, mining apparatus 26 is basically similar to the auger type miners commercially used in the mining of coal. Accordingly, this apparatus will be described only to the extent necessary for an understanding of the present invention.

Apparatus 26 includes a mining head 72 with teeth 74 for dislodging tar sand from formation 22, a helical conveyor 76 for conveying the dislodged material to shaft 30 or the face of outcrop 28 through a casing 77, an elongated shaft 78 to which the miner head and conveyor are fixed, and a drive mechanism 80 for rotating the miner head and conveyor via shaft 78.

Mining apparatus 26 differs from a conventional auger type miner in that the conveyor 76 is surrounded by a casing, in that shaft 78 is hollow, and in that nozzles or apertures 84 are provided in the forward end of the shaft; i.e., the end adjacent miner head 72. Also, the mining apparatus has a manifold 86 providing fluid communication between solvent supply line 66 and shaft 78.

The fluorochlorocarbon solvent is circulated through shaft 78 to its forward end where it is discharged through nozzles or apertures 84 and mixed with the mechanically dislodged tar sand by conveyor 76 as the tar sand is dislodged from formation 22. This reduces the viscosity of the dislodged material from over a million centipoises to a few hundred centipoises at most, producing two salutary effects. One is to significantly facilitate the flow of the tar sand from the miner head through casing 77 to crusher 36; the other is to significantly reduce the power required to drive the conveyor and cutter head.

As indicated above, mining apparatus as just described is capable of removing material as far as 200-300 feet away from an outcropping such as 28 or a shaft such as 30. In such circumstances, multiple casing sections and conveyor flights are required. Auger type miners with extractors for recovering conveyor flights from one mining operation and transferring them to the next are available (see, for example, COAL MINING AND PROCESSING, March, 1974, pages 46 et seq.); and the same mechanism can with only minor changes be used to transfer casing sections. Accordingly, a detailed description of the mechanism by which this is accomplished is likewise not believed to be necessary herein.

An important feature of the casing is that it can be extended to cover virtually all the auger or none of it, depending on the bed mining and material handling requirements and thereby the operator can selectively mine the ore bed. As the auger removes tar sands there will be a flow into the void created by the auger, that in vertical section, would have characteristics similar to solids flow in a bin, in that on an angle relatively similar to the angle of repose of the material, a dead area will be established which can be mined, by simply extending or retracting the auger head and the casing an appropriate distance. Similarly, any tendency towards rat holing or channeling can be circumvented by manipulating the extension of the casing and the auger. By utilizing joints in the casing that are liquid and vapor tight any potential for media loss or migration into the ore bed would be eliminated.

Finally, the extension of the casing would remove the active mining area a sufficient distance to reduce or eliminate shear forces that could affect the vertical shaft structure or in the case of mining against a high wall reduce or eliminate the potential for ore or overburden material from collapsing on the equipment building.

Trichlorofluoromethane is several times as dense as air and consequently diffuses only slowly into the surrounding environment. Accordingly, the loss of solvent by evaporative diffusion in enclosed spaces such as at the bottom of a shaft is so small that it can be ignored, a feature of practical importance. In operating in a more open area such as from a vertical outcrop, the equipment can readily be hermetically encased and any solvent which evaporates circulated to the purge, condensor unit and recovered.

Modifications may of course be made in the exemplary apparatus described above without exceeding the scope of the present invention. For example, the low permeability of the formation may inhibit the diffusion of the solvent to the extent that the casing surrounding the auger can be partly or entirely eliminated although this must be balanced against the likelihood that tar sand will subside into the auger throughout its length, requiring additional power to rotate the auger and spray nozzles along its length. In any event the foregoing and other modifications which will readily occur to those skilled in the relevant arts are fully intended to be covered in the appended claims to the extent they are not expressly excluded therefrom.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of recovering bitumen from a tar sand which comprises the steps of: mechanically dislodging the tar sand from a deposit thereof; reducing the viscosity of the dislodged material by mixing a fluorochlorocarbon solvent therewith under ambient conditions; transferring the resulting mixture to a separation operation; and there recovering the bitumen by dissolving it in a fluorochlorocarbon solvent as aforesaid, mechanically separating the resulting solution from the insoluble components of the tar sand, and stripping the solvent from the bitumen to isolate the latter.

2. The method of claim 1 together with the step of comminuting the dislodged material to facilitate the transfer of said material to the separation operation.

3. The method of claim 1 wherein the dislodged material is transferred to the separation operation by forming a slurry of said material and a fluorochlorocarbon solvent as aforesaid and pumping said slurry to said operation.

4. The method of claim 1 wherein a fluorochlorocarbon solvent as aforesaid is mixed with the dislodged material in the comminution step to facilitate the comminution and subsequent handling of said material.

5. The method of claim 1 together with the steps of stripping from the insoluble components of the tar sand solvent associated therewith and recovering and recirculating said solvent and the solvent stripped from the bitumen.

6. A method of removing a tar sand or similar composite from a formation thereof which includes the steps of: dislodging the composite from the formation with a mechanical miner; then reducing the viscosity of the composite by mixing a fluorochlorocarbon solvent therewith; and conveying the resulting mixture away in admixture in said solvent.

7. The method of claim 6 wherein the steps of dislodging the composite and of thereafter reducing the viscosity of said composite are carried out at ambient temperature.

8. A method of recovering a tar sand or like composite from a formation in which said composite is deposited, said method comprising the steps of: mechanically dislodging the composition from said formation; mixing a fluorochlorocarbon solvent with the dislodged material under ambient conditions to reduce the viscosity of soluble constituents of and thereby increase the conveyability of the composite; and conveying the resulting material away from the location where it was dislodged from the formation.

9. The method of claim 8 wherein the fluorochlorocarbon solvent is trichlorofluoromethane.

10. A method of recovering a tar sand or like composite from a formation in which said composite is deposited, said method comprising of the steps of: mechanically dislodging the composite from said formation with an auger miner; mixing a fluorochlorocarbon solvent with the dislodged material to reduce the viscosity of soluble constituents of and thereby increase the conveyability of said material; and conveying the material away from the location where it is dislodged from the formation through a casing means which is impermeable relative to said solvent to thereby inhibit the diffusion of the solvent into said formation.

11. A method of claim 10 together with the step of relocating said casing means relative to said auger miner to shift the location at which material is dislodged from the formation and thereby optimize the removal of the composite from the formation by promoting optimal contact between the miner and the composite.

12. A method of recovering bitumen from a tar sand which comprises the steps of: mechanically dislodging the tar sand from a deposit thereof; reducing the viscosity of the dislodged material by mixing trichlorofluoromethane solvent therewith; transferring the resulting mixture to a separation operation; and there recovering the bitumen by dissolving it in a solvent as aforesaid, mechanically separating the resulting solution from the insoluble components of the tar sand, and stripping the solvent from the bitumen to isolate the latter.

13. A method of removing a tar sand or similar composite from a formation thereof which includes the steps of: mechanically dislodging the composite from the formation; reducing the viscosity of the composite by mixing trichlorofluoromethane solvent therewith; and conveying the resulting mixture away in admixture in said solvent.

* * * * *